Oct. 30, 1962  R. E. GAYLE  3,061,230
FISHING REEL
Filed Jan. 6, 1961  2 Sheets-Sheet 1

INVENTOR.
ROBERT E. GAYLE
BY
Fishburn & Gold.
ATTORNEYS

Oct. 30, 1962 R. E. GAYLE 3,061,230
FISHING REEL
Filed Jan. 6, 1961 2 Sheets-Sheet 2
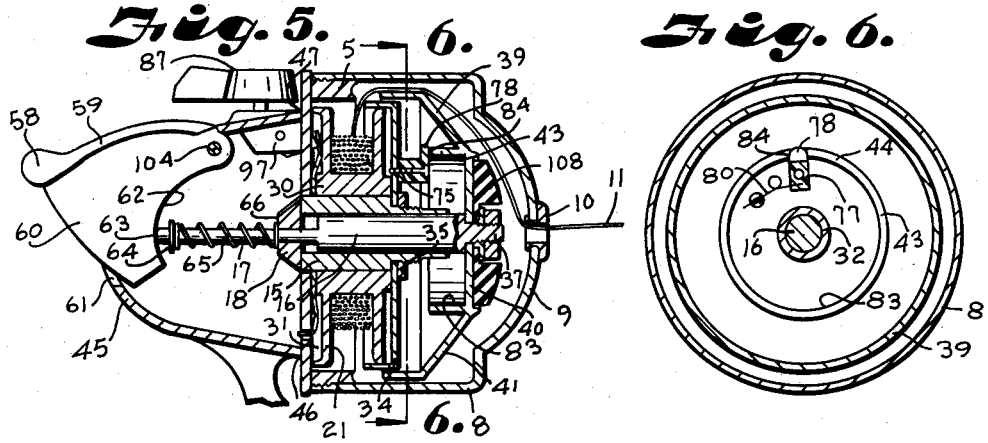
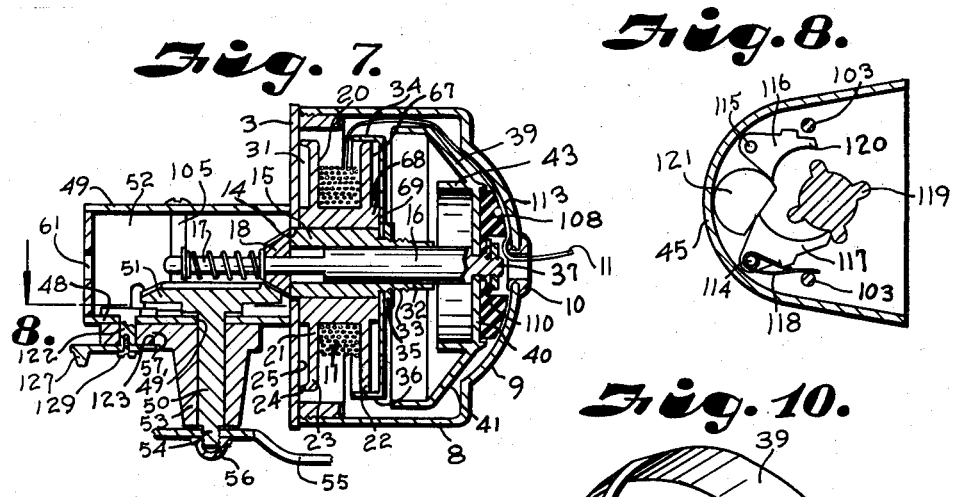
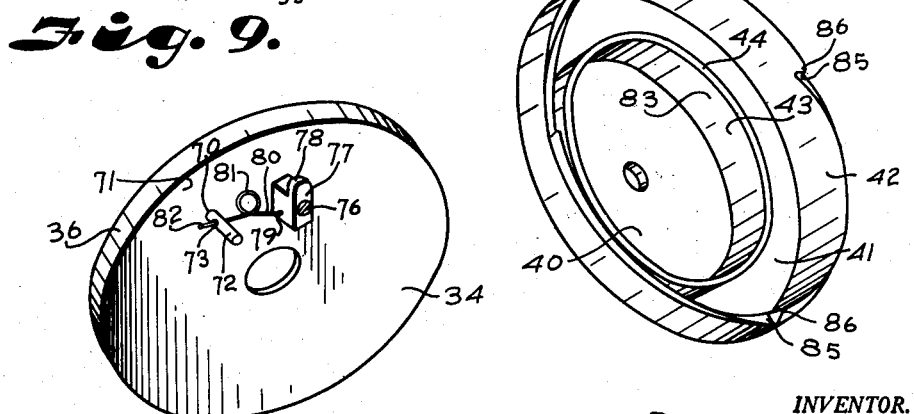
INVENTOR.
ROBERT E. GAYLE
BY
Fishburn and Gold
ATTORNEYS

United States Patent Office 3,061,230
Patented Oct. 30, 1962

3,061,230
FISHING REEL
Robert E. Gayle, Shawnee Mission, Kans. (% Phantom Products, Inc., 1800 Central St., Kansas City, Mo.)
Filed Jan. 6, 1961, Ser. No. 81,106
2 Claims. (Cl. 242—84.2)

This invention relates to improvements in fishing reels of the spinning type wherein the spool holding the line is stationary and the fishing line rolls off one end of the spool when casting.

With reels of this type, backlash of the line is substantially prevented because of the lack of spool inertia. Such reels are superior in casting great distances and require less experience or skill in casting.

The principal object of the present invention is to provide an improved line pickup and release mechanism and more specifically a spooling member rotatable on a shaft carried by the frame of the reel having notches in a side face thereof for engaging the line to cause the line to rewind upon the spool by turning of a crank also carried by the frame after the line has been cast.

Other objects of the present invention are to provide a brake or guard plate on the shaft adjacent the spool over which the line rolls when casting; to provide for mounting of a cam or dog member on the guard plate cooperating with an internally projecting flange on the spooling member to cause engagement of the line by the spooling member and disengagement therefrom; to provide the spooling member with a circular portion facing the spool and having notches therein for picking up the line and winding it on the spool when it is retrieved after casting; to provide friction means between the spool and the guard plate, and to provide means operable outside the frame of the reel for moving the spooling member out of contact with the spool to allow the line to be peeled off the spool when casting.

Still further objects of the present invention are to provide improved brake and drag means for returning movement of the spool and spooling member respectively in operation of the reel; to provide a gear drive mechanism for a reel of this type to facilitate casting and retrieving of the line and accelerating the retrieving speed thereof; to provide an anti-reverse mechanism for the reel; to provide an improved adjustable drag operable to play out the line when the tension exceeds the predetermined amount of pressure, and to provide a device of this character simple and economical to manufacture.

Other objects and advantages of this invention will become apparent from the following description taken in connection with the accompanying drawings wherein are set forth by way of illustration and example certain embodiments of this invention.

FIG. 5 is a cross sectional view through the reel in free spooling position and particularly illustrating the cam mechanism engaging the internally extending flange portion of the spooling member.

FIG. 6 is a cross sectional view taken on a line 6—6, FIG. 5.

FIG. 7 is a cross sectional view of the reel particularly illustrating the line held between the spooling member and the casing of the frame just prior to casting.

FIG. 8 is a cross sectional partly fragmentary view of the anti-reverse mechanism.

FIG. 9 is an enlarged perspective view of the guard plate with the cam mechanism mounted thereon.

FIG. 10 is an enlarged perspective view of the spooling member particularly illustrating the notches for engaging the line to wind the same on the spool.

Figure 1:
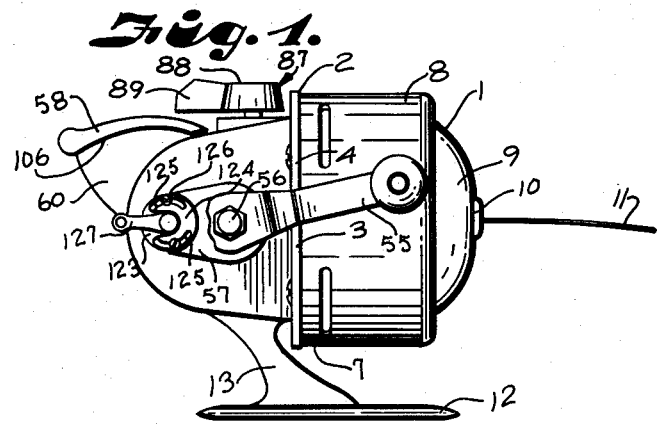
FIG. 1 is a side view illustrating my improved reel.

Referring more in detail to the drawings:

1 designates a reel embodying the features of my invention which includes a frame or casing designated generally at 2 and including a back or end plate 3 generally circumferential in form having a marginal flange 4 and a circumferential flange 5 extending from one side thereof and between the flanges 4 and 5 are provided with threads 6 for receiving an internally threaded flange 7 of a cover 8 having a somewhat conical or rounded end 9 provided with a grommet or the like 10 through which a line 11 is adapted to extend.

In order to mount the reel upon a fishing rod (not shown) there is provided a connecting member or tang 12 which is connected to the frame of the reel by a shank 13 (FIG. 1). The back plate 3 has an opening 14 substantially at the center thereof and secured therein is a sleeve bearing 15 in which is rotatably mounted a drive shaft 16 having a reduced end 17 extending outwardly through the sleeve bearing 15 and mounted thereon is a pinion 18 which bears against the end of the sleeve bearing 15. The sleeve bearing 15 is stationary and may be press fitted or otherwise permanently mounted in the opening 14.

A fishing line 11 is mounted upon an annular cylindrical grooved portion or core 20 of a line spool 21 having opposed spool ends 22 and 23 for accommodating the line therebetween and the end 23 is turned laterally away from the end 22 forming an annular flange 24 which engages against the inside or front wall 25 of the end plate 3 of the frame structure as illustrated in FIG. 7. The end plate 3 is provided with a slot 26 (FIG. 3) for receiving a laterally turned flange portion 27 of a spring steel washer 28 which engages over the sleeve bearing 15 and between the end 29 of a hub portion 30 of the line spool 21, the circumferential portion of the spring washer engaging in the space 31 between the hub 30 and the flange 24 on the end 23 of the line spool for a purpose later described.

The sleeve bearing 15 extends forwardly from the end plate 3 and is reduced as indicated at 32 (FIG. 7) and threaded as indicated at 33. Mounted upon the reduced portion 32 is a brake or guard plate 34 secured thereon by a threaded nut 35. The plate 34 has a circumferential flange portion 36 forming a rim extending over the end 22 of the line spool 21 and toward the back plate 3 also as illustrated in FIG. 7.

The drive shaft 16 is rotatably and axially slidable in the bearing 15 and has its outer end 37 (FIG. 3) reduced and threaded as indicated at 38. Mounted upon the reduced end 37 of the shaft 16 is a spooling member 39 of circular formation having a plate portion 40 (FIG. 10) and a portion 41 sloping toward the spool 21 and a circumferential flange member portion 42 also extending toward the spool 21. The spooling member 39 includes an annular flange member 43 also extending parallel with the flange portion 42 of the spooling member 39 and is substantially of the same diameter as the plate portion 40 thereof. The annular flanged portion 43 has an annular continuous unbroken bearing edge 44 for a purpose later described.

The frame 2 of the reel includes a substantially U-shaped bracket member 45 (FIG. 5) having the ends of the arms thereof rigidly secured to the rear face of the end plate 3 as indicated at 46 and 47 and mounted on each side of the U-shaped brackets are side plates 48 and 49 (FIG. 7). The plates 48 and 49 are substantially identical in shape to fit the contour of the edges of the bracket member 45. The plate 48 has an opening 49' through which extends a shaft 50 having a gear 51 on the inner end thereof, and located within the housing 52 formed by the plates 48 and 49 and the bracket 45, meshing with the pinion 18 on the shaft 16.

Mounted upon the shaft 50 outside the plate 48 and extending laterally therefrom is a cylindrical hub member 53 surrounding the shaft 50 having a reduced threaded end 54 for receiving a crank member 55 held on the shaft by a threaded nut 56. The hub 53 has a laterally extending portion 57 for a purpose later described. The crank member 55 has a short shaft 55' for quick retrieve of the line and a longer shaft 56' for use when more power is required.

The actuating or drive shaft 16 is moved lengthwise to position the spooling member 39 by means of a thumb piece 58 (FIG. 5) of slightly curved formation as indicated at 59 and has an arm portion 60 thereof extending through a slot 61 in the bracket 45. The thumb piece is located at the rear of the bracket and slightly above the center thereof and the arm or rib 60 has a curved inner face 62 for engaging against the end 63 of the reduced end 17 of the drive shaft 16. The end 17 has a stop member 64 mounted thereon and a coiled spring 65 has one end engaging thereagainst and its other end against the end 66 of the pinion 18 as illustrated in FIGS. 3 and 5 to exert pressure rearwardly on the spooling member when in normal position, but when the thumb piece 58 is depressed, the spooling member will be moved out of contact with the spool as later described.

The outer side face 67 of the end 22 of the line spool 21 has a boss 68 which bears against the inner face of the guard plate 34 as indicated at 69 (FIG. 7). Mounted in an opening 70 in the side face 71 (FIG. 9) of the plate 34 is a pin 72 having a transverse opening 73 and spaced from the opening 70 is a threaded opening 74 for receiving the threaded end 75 of a screw 76 for pivotally mounting on the plate a cam or dog 77 having a lip portion 78 extending from one side thereof. The cam member 77 is also provided with a socket 79 for receiving one end of a spring member 80 having a coil 81 as substantially the middle thereof and its free end 82 extending through the opening 73 in the pin 72 as best illustrated in FIG. 9.

Figure 3:
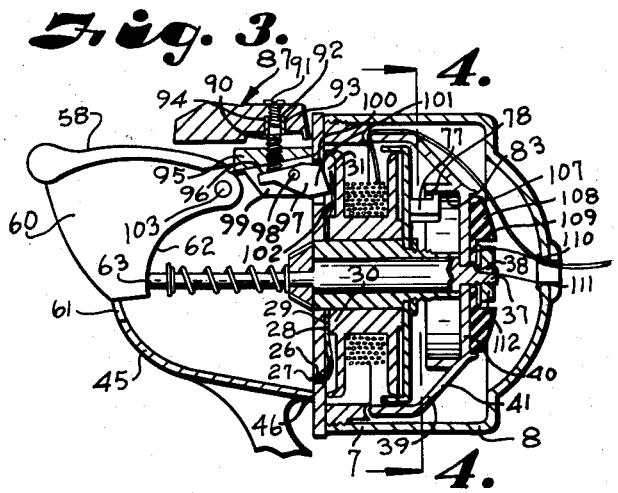
FIG. 3 is a cross sectional view through the reel particularly illustrating the drag mechanism and the spooling member in winding position.
Figure 4:
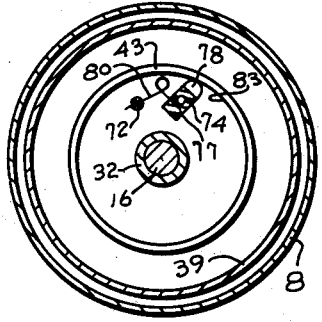
FIG. 4 is a cross sectional view taken on a line 4—4, FIG. 3, particularly illustrating the cam mechanism in the position shown in FIG. 3.

When the reel is in winding position as shown in FIGS. 3 and 4 the cam 77 is in the position as shown therein with the edge of the lip 78 engaging the inner wall or surface 83 of flange 43 of the spooling member 39. When the reel is in the position as shown in FIGS. 5 and 6 which is for casting, the lip 78 frictionally engages over the edge 44 as indicated at 84. Rotation of the crank will due to frictional engagement cause the cam 77 to rotate on the screw pin 76 to move the lip off of the edge 44 and again assume the position on the inside face 83 of the flange 43.

The means for the pickup of the line which is usually carried by the spooling member and heretofore usually were radialy extending pins are here shown and illustrated as spaced notches 85 having hook portions 86 in the periphery of the flange portion 42 of the spooling member 39 as best illustrated in FIG. 10. When the reel is in the position shown in FIG. 3, or winding position, the hooks will engage the line and rotation of the crank will wind the line on the spool 21. Movement of the thumb piece 58 will move the shaft 16 forwardly thus releasing the line from the hooks 86 as shown in the position for free spooling as illustrated in FIG. 5. When the spooling member is thus moved forwardly or to the right as shown in FIG. 4 the flange 42 thereof will move past the flange portion 36 of the plate 34 and thus remove the line from the hook 86.

An adjustable drag mechanism generally indicated at 87, FIG. 1, is provided for permitting limited or restricted rotation of the spool member 21 so that the line 11 may peel off of the spool even when it is in contact with the hooks 86 as may be necessary when playing a large fish. The drag mechanism includes a dial plate 88 having a finger member 89 which is attached to a short shaft 90 by a screw or the like 91 which engages in the threaded socket 92 of the square head 93 which engages in a square socket 94 on the lower side of the plate 88.

The shaft 90 has a threaded lower end which engages in a threaded plate 95 forming a portion of the bracket 45 and has its lower end extending therethrough and engaging the top side 96 of a lever member 97 pivotally mounted by a pin 98 on spaced brackets 99 carried on the underneath side of the bracket 45 as illustrated in FIG. 3. The plate 3 of the frame member near its upper end is provided with a slot 100 through which the forward end 101 of the lever member 97 extends and which engages against the side 102 of the spring washer or drag member 28. By turning of the finger member 89 the proper adjustment may be made on the drag mechanism to cause the required tension of the spring washer member 28 against the side of the end portion 23 of the spool to provide the restricted rotation thereof.

The plate 48 includes a pair of parallel extending pins 103 spaced on the plate and rigidly secured thereto, the upper one of which extends through an opening 104 in the forward portion of the lever portion 60 of the thumb member 58 to pivotally mount the thumb member on the bracket 45. The plate 49 is secured to the bracket member and to the opposite plate member by screws or the like as indicated at 105, FIG. 2, which have their threaded ends engaging in internal threads on the pins 103. The portion 59 of the thumb member 58 is wider than the lever portion 60 thus providing an overhanging portion 106 which when the thumb member is depressed will rest against the outer surface of the bracket 45.

The arrangement is such that a fisherman may rest his thumb on the thumb piece 58 and by pressure thereon project the shaft 16 forwardly to free the hooks 86 on the spooling member from the line so that the line may be cast. Continued pressure on the thumb member will project the shaft and carry with it the spooling member, the outer edge of which has a recessed portion 107 for receiving a circular rubber washer member 108 having a socket portion 109 for receiving a washer 110 which has a boss 111 extending into the opening in the washer and which is held on the shaft by a nut 112, FIG. 3. When the shaft 16 with the spooling member mounted thereon is thus projected by pressure on the thumb member, the line 11 will be snubbed between the washer 108 and the inside of the cover or end 9 as indicated at 113, FIG. 7, to hold the line therebetween. Pressure on this thumb member is continued during the back swing of the arm and after the forward cast is started, release of the thumb will release the grip on the line through the snubbing as above described to allow free spooling of the apparatus.

Mounted on the inside of the plate 48 by pins or the like 114 and 115 are spring biased spaced dogs 116 and 117 as indicated at 118. The gear 51 includes spaced teeth or ribs 119 adapted to be engaged by the pawl portion 120 of the dogs 116 and 117 as illustrated in FIG. 8. Mounted between the dogs 116 and 117 and near the rear end of the housing provided by the bracket 45 is a cam member 121 which is pivotally mounted to the plate 48 by pin 122 which extends outwardly through the plate 48 and through the extension 57 of the hub member 53. The outer edge of the extension 57 is recessed as indicated at 123 and mounted in the recess is a U-shaped member 124 having spaced semi-circular grooves 125 on each side thereof and the U-shaped member being held in place by screws or the like 126. The pin 122 has a threaded bore and a lever 127 is mounted thereon by threaded screw 129. The lever being rotatable to rotate the cam member 121 to contact either of the dogs 117 and 118. By loosening of the screws 126 the U-shaped member 124 may be rotated on the plate to change the angle of the cam 121 to operate either of the dogs 116 and 117 as desired.

The position of the cam 121 determines which of the dogs is effective to prevent reverse turning of the drive gear. The location of the cam in the position as shown in FIG. 8 locks the gear against rotation in one direction and movement of the cam so that the dog 116 is operative will limit rotation in the other direction.

Figure 2:
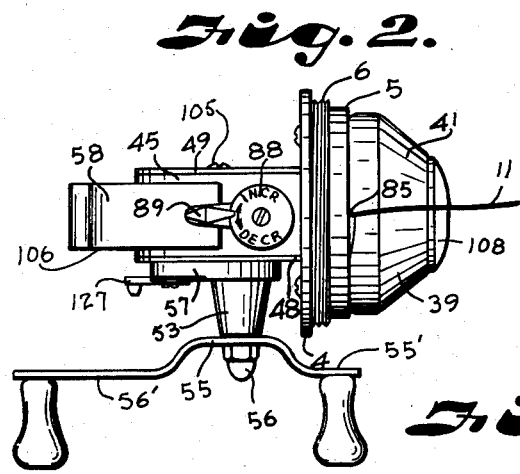
FIG. 2 is a top plan view particularly illustrating the notch in the spooling member engaging the line, with the cover removed.

In operation of a reel constructed and assembled as described, when a cast is to be made the member 58 is manipulated to move the drive shaft 16 forward carrying with it the spooling member to snub the line between the inside of the cover 9 and the curved surface of the washer member 108 on the end of the spooling member. This snubbing is continued through the backward swing of the arm. After start of movement of the arm forward, release of the thumb member 58 will release the line from its snub and allow the line to pull off of the spool as in the position shown in FIGS. 5 and 6. It will be noted the line 11 passes over the flanged portion 36 of the guard plate 34 and also the flanged portion 42 of the spooling member 39. It will also be noted that the lip 78 of the cam or dog 77 is engaged against the rim 44 of the spooling member to prevent further retraction of the spooling member when the cast is being made. This position allows free spooling of the line for casting. When it is desired to retrieve the line, turning of the crank 55 will rotate the spooling member and since the lip 78 of the dog 77 is engaging the rim 44 of the spooling member by friction, rotation of the spooling member will rock the dog 77 and release the lip from the rim 44 permitting the spooling member to move axially toward the spool 21, the lip moving inside of the flanged portion 43 of the spooling member to the position shown in FIGS. 3 and 4, and when in this position the line will again be picked up by the hooks 86 of the notches 85 in response to further rotation of the crank and spooling member 39 as illustrated in FIG. 2 and cause the line to be rewound upon the spool by continuing operation of the crank.

It is to be understood that while I have illustrated and described one form of my invention it is not to be limited to the specific form or arrangement of parts herein described and shown except insofar as such limitations are included in the claims.

What I claim and desire to secure by Letters Patent is:

1. In a spinning reel for fishing line including a frame, a sleeve bearing carried on said frame, a shaft rotatably mounted and axially slidable in said sleeve bearing, a normally stationary spool arranged to hold the line and mounted for free delivery of the line over an end thereof, a spooling member mounted on said shaft and rotatable therewith, resilient means urging said spooling member toward said spool, a guide plate mounted on said sleeve between said spool and spooling member, a cover for said spool and spooling member and having an opening coaxial with said shaft for receiving the line, manually operable means connected to said shaft outside said cover for selectively rotating said shaft, said spooling member including an outer ring portion projecting toward said spoon and having a rim normally encircling said guide plate and a portion of said spool, hook means on said rim for selectively engaging said line, means for selectively axially displacing said spooling member from a position adjacent said spool to a position axially remote from said spool and said guide plate for disengaging said line from said hook means permitting free movement of the line from the spool, said spooling member having an inner ring portion projecting toward said guide plate and forming a cylindrical surface terminating in an annular continuous unbroken edge facing said guide plate, and a dog pivotally mounted on said guide plate and having a lip portion for selectively engaging said cylindrical surface and said annular edge, and spring means for resiliently urging said lip portion radially of said cylindrical surface for contacting said annular edge to retain said spooling member in said displaced position, whereupon the rotation of said shaft creates a frictional force between said lip portion and said annular edge for frictionally pivoting said lip portion out of engagement with said annular edge causing said resilient means to return said spooling member to said position adjacent said spool.

2. The spinning reel of claim 1 wherein said cylindrical surface faces toward said shaft.

References Cited in the file of this patent

UNITED STATES PATENTS

| | | |
|---|---|---|
| 2,584,020 | Humphreys | Jan. 29, 1952 |
| 2,613,468 | Hand | Oct. 14, 1952 |
| 2,644,647 | Denison et al. | July 7, 1953 |
| 2,862,679 | Denison et al. | Dec. 2, 1958 |
| 3,020,666 | Hull | Feb. 13, 1962 |

FOREIGN PATENTS

| | | |
|---|---|---|
| 1,110,429 | France | Oct. 12, 1955 |